US 12,122,355 B2

(12) United States Patent
Crisp et al.

(10) Patent No.: US 12,122,355 B2
(45) Date of Patent: Oct. 22, 2024

(54) ELECTRICAL POWER CONTROL METHOD

(71) Applicant: Ford Global Technologies, LLC, Dearborn, MI (US)

(72) Inventors: Nicholas Dashwood Crisp, Benfleet (GB); David Ramiro Garcia, Richmond (GB); David Cox, London (GB); Matthew Mitchell, Rugeley (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/206,471

(22) Filed: Jun. 6, 2023

(65) Prior Publication Data

US 2023/0391314 A1 Dec. 7, 2023

Related U.S. Application Data

(63) Continuation of application No. 17/179,777, filed on Feb. 19, 2021, now Pat. No. 11,708,065.

(51) Int. Cl.
*B60W 20/16* (2016.01)
*B60K 6/42* (2007.10)
(Continued)

(52) U.S. Cl.
CPC ............ *B60W 20/16* (2016.01); *B60W 10/08* (2013.01); *F01N 3/2026* (2013.01); *B60K 6/42* (2013.01); *B60K 6/44* (2013.01); *B60K 6/448* (2013.01); *B60W 10/24* (2013.01); *B60W 20/10* (2013.01); *B60W 2510/24* (2013.01); *B60W 2510/244* (2013.01); *B60W 2510/30* (2013.01); *F01N 3/2006* (2013.01); *F01N 3/2013* (2013.01);
(Continued)

(58) Field of Classification Search
CPC ...... F01N 3/2006; F01N 3/2013; F01N 3/202; F01N 3/2026; F01N 3/2825; F01N 3/2828; F01N 5/00; F01N 5/02; F01N 5/04; F01N 2240/04; F01N 2240/16; F01N 2550/22; F01N 2590/11; F01N 2900/0602; B60K 6/42; B60K 6/44; B60K 6/445; B60K 6/448; B60W 10/06; B60W 10/08; B60W 10/24; B60W 10/26; B60W 10/30; B60W 20/10; B60W 20/15; B60W 20/16; B60W 20/20; B60W 2510/24; B60W 2510/242; B60W 2510/244; B60W 2510/30; B60W 2510/305; B60W 2530/12; B60W 2710/24; B60W 2710/244; B60W 2710/248; B60W 2710/30; B60W 2710/305

See application file for complete search history.

(56) References Cited

U.S. PATENT DOCUMENTS 5,523,547 A 6/1996 Miller
5,811,884 A 9/1998 Matuoka et al.
(Continued)

FOREIGN PATENT DOCUMENTS

WO 2011086656 A1 7/2011

*Primary Examiner* — Binh Q Tran
(74) *Attorney, Agent, or Firm* — Haley Guiliano LLP

(57) ABSTRACT

Systems and methods are described for electrical power control of a hybrid vehicle. A change in an electrical load of an ancillary component of the vehicle is determined. In response to determining the change in the electrical load of the ancillary component, an electrical load of an electrically heated catalyst of the vehicle is adjusted.

16 Claims, 8 Drawing Sheets

(51) Int. Cl.
*B60K 6/44* (2007.10)
*B60K 6/448* (2007.10)
*B60W 10/08* (2006.01)
*B60W 10/24* (2006.01)
*B60W 20/10* (2016.01)
*F01N 3/20* (2006.01)
*F01N 5/04* (2006.01)

(52) U.S. Cl.
CPC ............ *F01N 5/04* (2013.01); *F01N 2240/04* (2013.01); *F01N 2240/16* (2013.01); *F01N 2550/22* (2013.01); *F01N 2590/11* (2013.01); *F01N 2610/105* (2013.01); *F01N 2900/04* (2013.01)

(56) References Cited

U.S. PATENT DOCUMENTS

| | | |
|---|---|---|
| 9,109,489 B2 | 8/2015 | Katsuta |
| 10,661,778 B2 | 5/2020 | Morisaki |
| 10,894,520 B2 * | 1/2021 | Nakayama ............ B60R 16/033 |
| 11,199,145 B2 * | 12/2021 | Hirooka .............. F02D 41/0255 |
| 11,708,065 B2 * | 7/2023 | Crisp .................... B60W 10/08 60/285 |
| 2011/0078999 A1 | 4/2011 | Gonze et al. |
| 2012/0173062 A1 | 7/2012 | Madurai et al. |
| 2012/0303200 A1 | 11/2012 | Ang |
| 2013/0035845 A1 * | 2/2013 | Takara .................. F01N 13/009 701/113 |
| 2014/0352283 A1 * | 12/2014 | Kumagai .............. F01N 3/2026 60/286 |
| 2014/0360162 A1 * | 12/2014 | Gonze ................... F01N 3/2013 60/274 |
| 2015/0218995 A1 | 8/2015 | Hashimoto |
| 2015/0285117 A1 | 10/2015 | Yoshioka |
| 2016/0114790 A1 * | 4/2016 | Bruce ...................... B60L 1/02 903/905 |
| 2017/0306821 A1 * | 10/2017 | Hashimoto ............. B60L 53/14 |
| 2019/0232948 A1 | 8/2019 | Nawata |
| 2021/0189936 A1 | 6/2021 | Korenaga |

\* cited by examiner

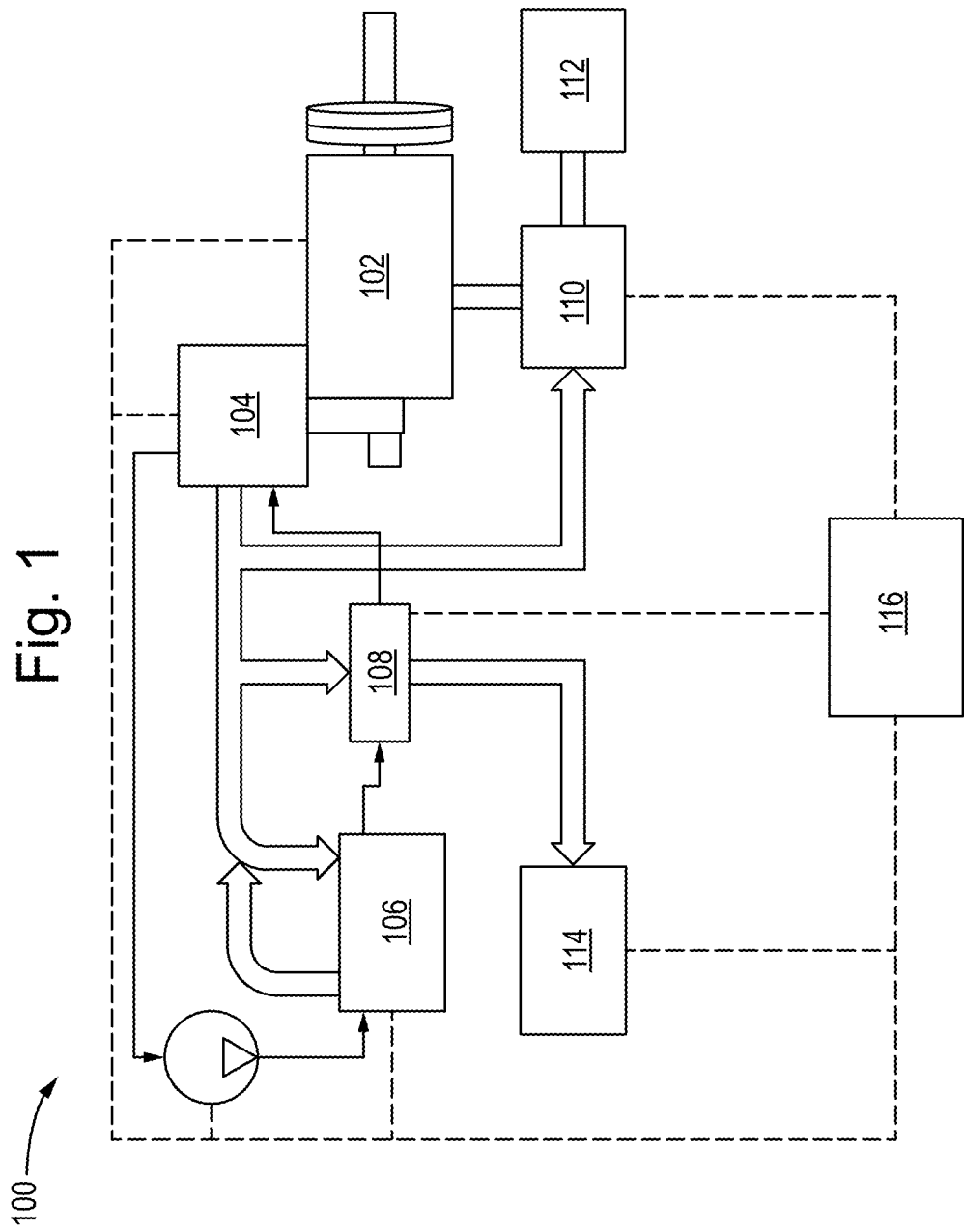

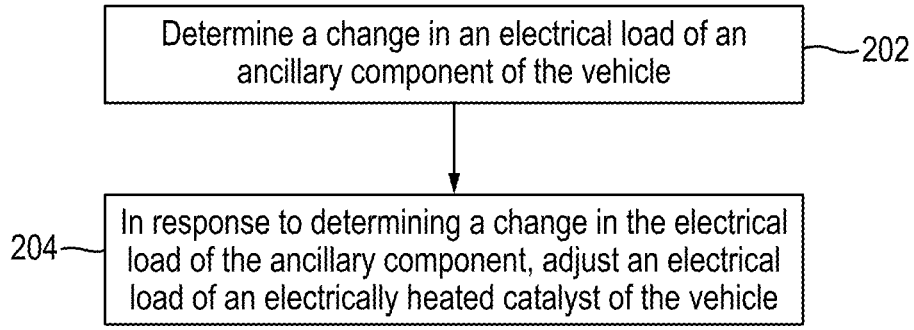
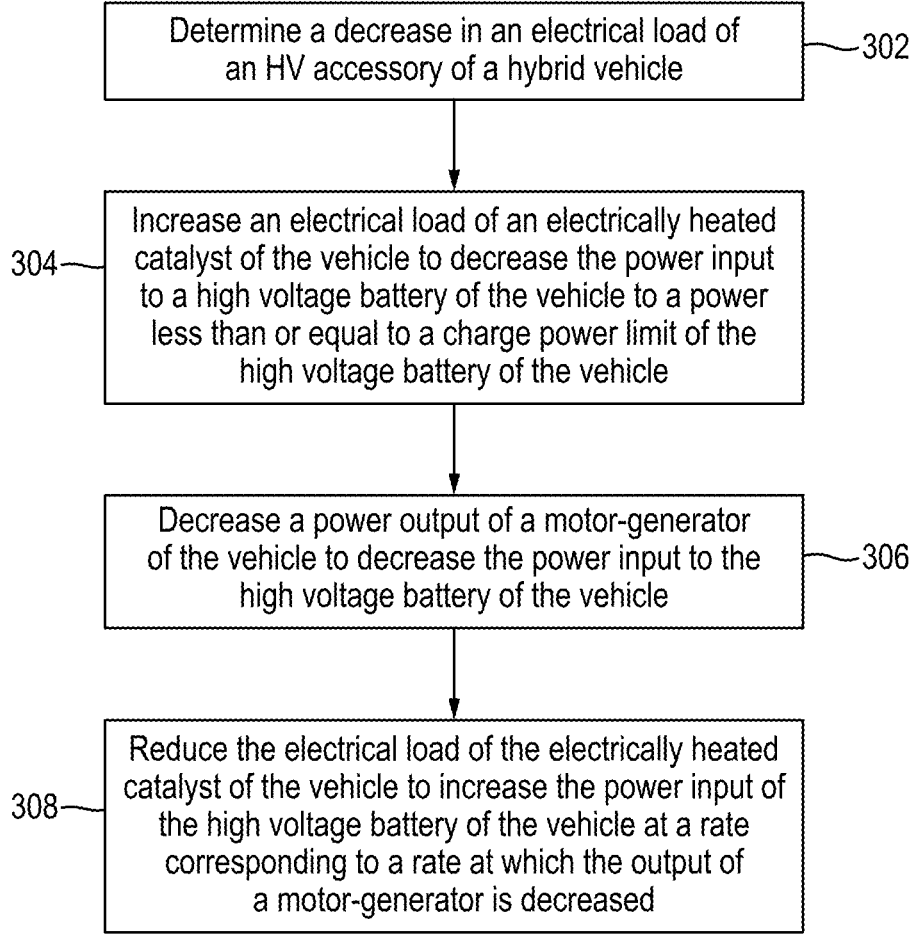

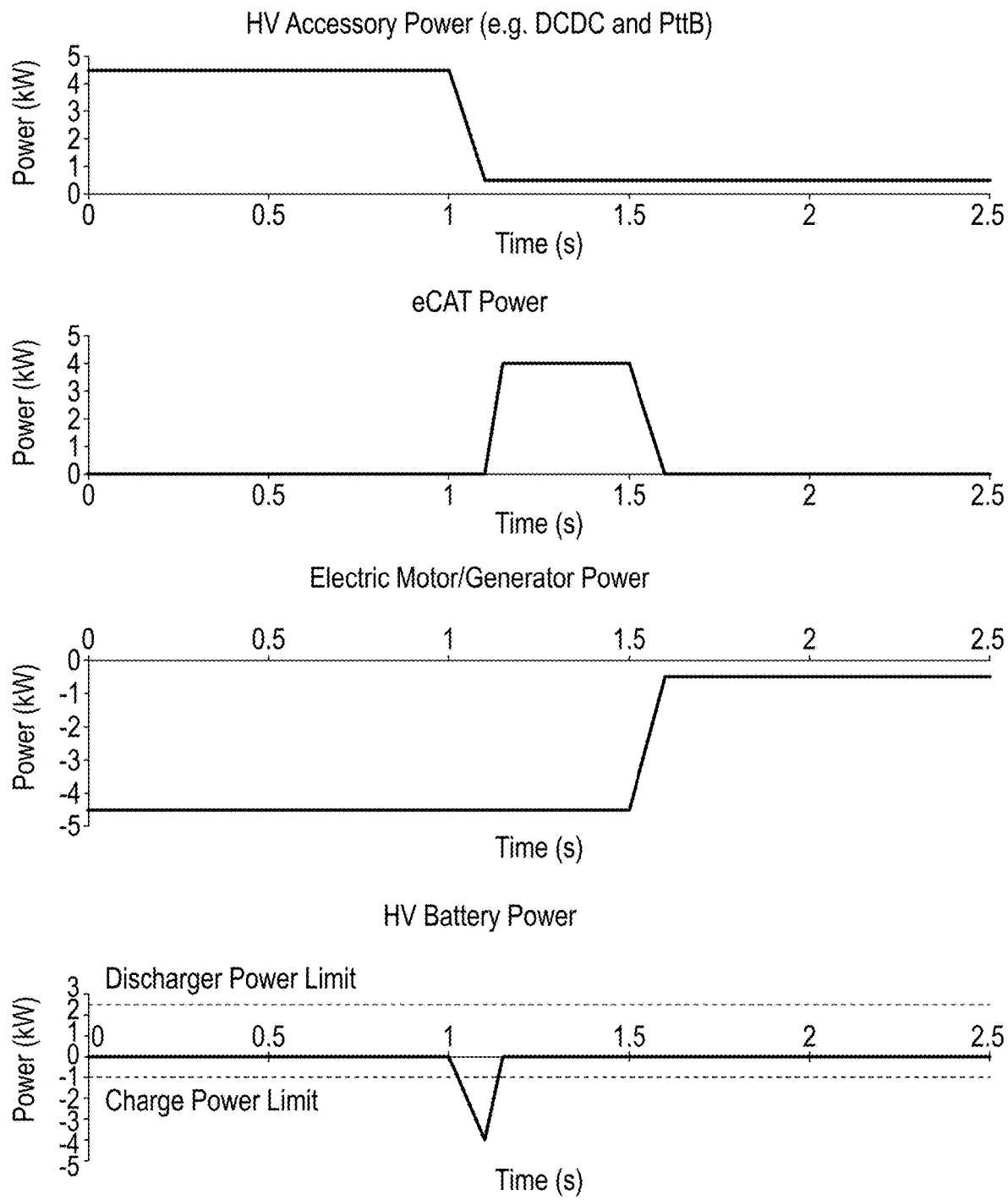

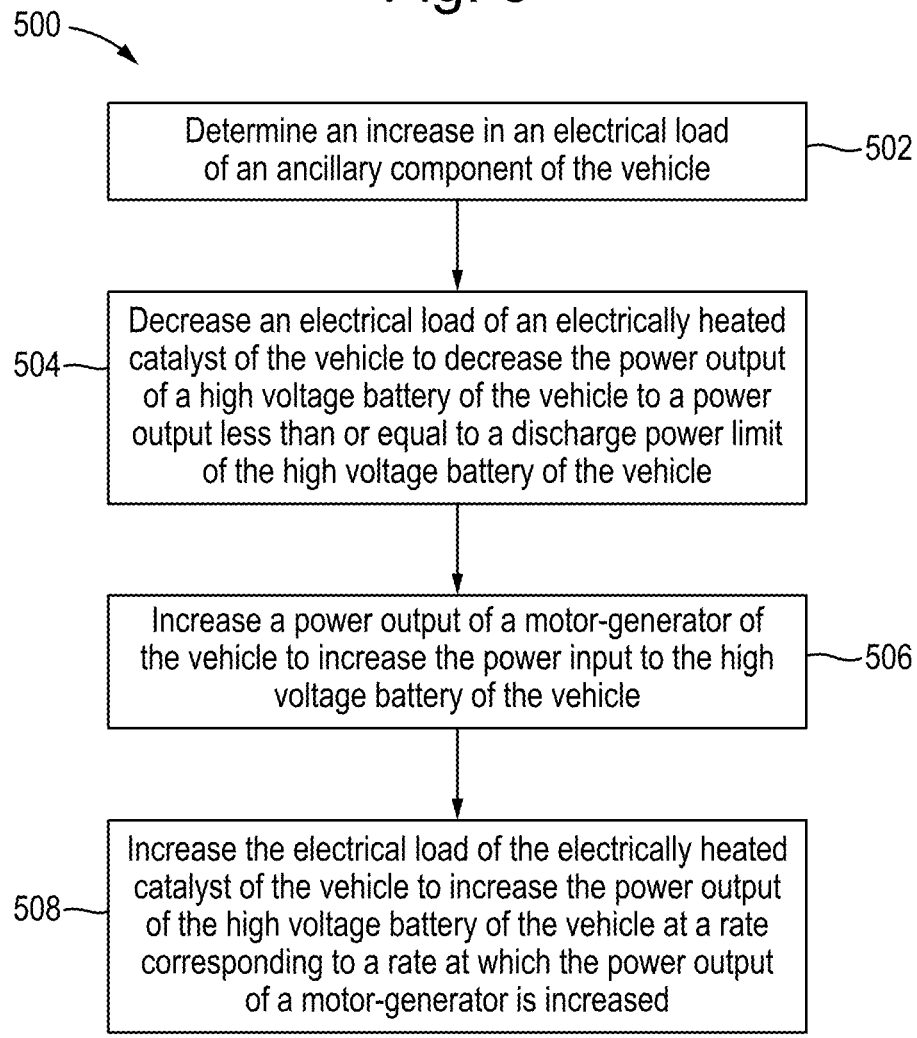

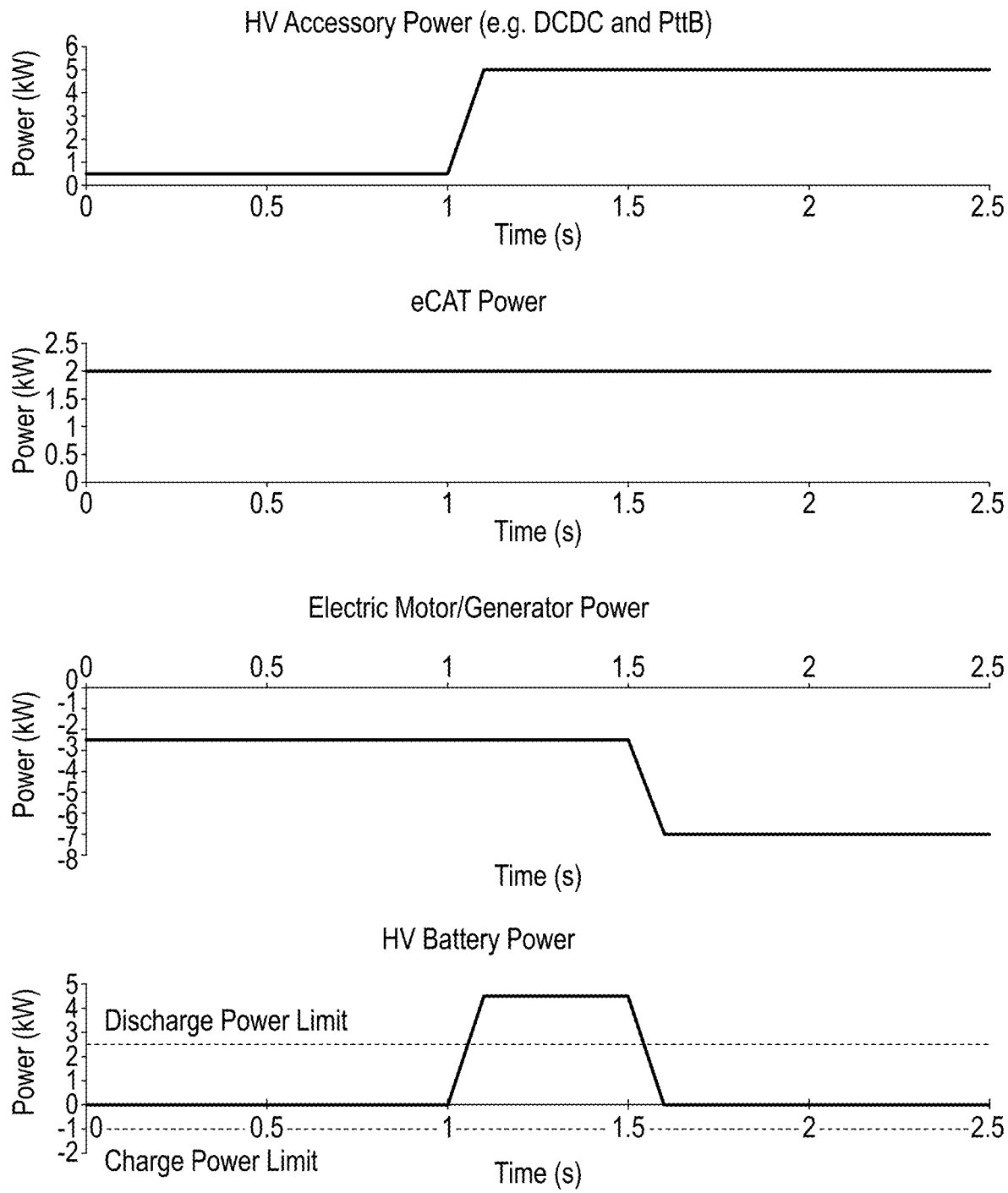

ELECTRICAL POWER CONTROL METHOD

CROSS REFERENCE TO RELATED APPLICATIONS

This application is a continuation of U.S. patent application Ser. No. 17/179,777, filed Feb. 19, 2021, the disclosure of which is hereby incorporated by reference herein in its entirety.

BACKGROUND

The present disclosure relates to electrical power control systems and methods for a hybrid vehicle. More particularly, but not exclusively, the present disclosure relates to controlling an electrical load of an electrically heated catalyst to offset transient electrical loads of other vehicle components.

SUMMARY

In a hybrid vehicle, such as a hybrid electric vehicle (HEV) or a mild hybrid electric vehicle (mHEV), it is desirable to support a range of accessory loads, e.g., a 12V DC-DC converter. In some cases, transient demand from an accessory can be very large (several kilowatts) and can exceed the transient power capability of a traction battery of the hybrid vehicle. In this case the battery power limits could be exceeded for a transient electrical accessory load, which might lead to shut-down of a power system of the vehicle, additional battery aging, and/or excessive voltage transient loads on a traction bus of the hybrid vehicle, leading to component damage or partial shut-down. In some cases, the traction bus may be a high voltage (HV) bus, such as a 350V bus of an HEV or a 48V bus of an mHEV.

One solution is to limit the electrical load of an accessory, either by design or using dynamic control methods, so that they cannot be allowed to consume power in a dynamic manner. However, this is not always practical, since some accessories are required to meet other requirements such as a low voltage (LV), e.g., 12V, quality and thus can only respect a transient constraint up to a certain point. Furthermore, in some use cases voltage ripple on a traction bus can degrade or inhibit the functionality of the loads which are supplied power from the traction bus, including but not limited to a DC-DC converter, an invertor, a compressor, a pump and/or a heating system.

Systems and methods are provided herein for improving the control of an electrical system of a hybrid vehicle, e.g., by offsetting transient power events using an electrical load of an electrically heated catalyst.

According to some examples of the systems and methods provided herein, a change in an electrical load of an ancillary component of the vehicle is determined. In some examples, the ancillary component may be a high voltage (e.g., 48V, 350V, or any other appropriate voltage) ancillary component. In some examples, the high voltage ancillary component may be a component of a high voltage circuit of the hybrid vehicle, such as an air-conditioning compressor, a power steering pump or a component of a heating system. In some examples, the high voltage ancillary component may be configured to run on an AC electrical supply, and thus may be slow to react to changing conditions, which may lead to one or more voltage transients on an HV circuit. In response to determining the change in the electrical load of the ancillary component, an electrical load of an accessory, e.g., an electrically heated catalyst, of the vehicle is adjusted, e.g., increased or decreased. For example, the electrical load of the electrically accessory may be adjusted to control a power of a high voltage circuit of the vehicle, e.g., a power output/power input of a high voltage battery of the vehicle. In the context of the present disclosure, the term "power" is understood to mean a power that is supplied by and/or supplied to one or more components of a high voltage circuit, e.g., a high voltage battery. For example, a battery may have a positive power when supplying electrical power to one or more other components, such as a traction motor and/or an ancillary component. A battery may have a negative power when receiving electrical power from one or more other components, such as a generator and/or another electrical power storage component. The definition of positive and negative electrical power is useful in the context of the present disclosure, as will become evident from the below description and accompanying figures, when describing the power flow to and from a battery, especially in relation to the power of one or more other components that interact with the battery. It is understood that the same convention applies to an electric motor-generator, e.g., the power of the motor-generator is positive when the motor-generator functions as a motor, e.g., when delivering power to a powertrain of a vehicle, and the power of the motor-generator is negative when the motor-generator functions as a generator, e.g., when delivering power to a battery of a vehicle.

In some examples, the electrical accessory may be any appropriate accessory of a hybrid vehicle that can be controlled using a linear control algorithm, e.g., such that it has a fast power response compared to other electrical accessories that use non-linear control methodologies.

In some examples, in response to determining the change in electrical load of the ancillary component, a power of a motor-generator of the vehicle may be adjusted. In some examples, in response to a change in the output of the motor-generator of the vehicle, the electrical load of the electrically heated catalyst of the vehicle may be further adjusted.

In some examples, the output of the motor-generator of the vehicle may be adjusted to control a power output of a high voltage battery of the vehicle.

In some examples, the electrical load of the electrically heated catalyst may be further adjusted at a rate corresponding to a rate at which the output of a motor-generator is adjusted.

In some examples, determining a change in an electrical load of an ancillary component comprises determining an increase in the electrical load of the ancillary component. In some examples, adjusting the electrical load of an electrically heated catalyst of the vehicle comprises reducing the electrical load of the electrically heated catalyst of the vehicle.

In some examples, determining the change in an electrical load of an ancillary component comprises determining a decrease in the electrical load of the ancillary component. In some examples, adjusting the electrical load of the electrically heated catalyst of the vehicle comprises increasing the electrical load of the electrically heated catalyst of the vehicle.

In some examples, the electrical load of the electrically heated catalyst of the vehicle is adjusted to decrease a power input to the high voltage battery of the vehicle to respect a battery charge limit. In some examples, the power input to the high voltage battery of the vehicle is decrease to a power less than or equal to a charge power limit.

In some examples, the electrical load of the electrically heated catalyst of the vehicle is adjusted to decrease a power output of the high voltage battery of the vehicle to respect a battery discharge limit. In some examples, the power output of the high voltage battery of the vehicle is decreased to a power less than or equal to a discharge power limit.

In some examples, the electrical load of the electrically heated catalyst is adjusted using a linear control algorithm, which means, for example, that the output of the electrically heated catalyst is proportional to its requested input.

In some examples, the connection state of the HV battery to the HV bus is determined, e.g., a faulted connected state with contactors open. In response to determining that the HV battery is disconnected from the HV bus, the electrical load of an accessory, e.g., an electrically heated catalyst, of the vehicle may be adjusted. In some examples, it is beneficial to adjust the electrical load of the electrically heated catalyst of the vehicle to balance the overall power of a vehicle powernet when the HV battery is disconnected from the HV bus, since the HV battery is unable to dampen voltage ripple in a disconnected state.

It shall be appreciated that other features, aspects and variations of the present disclosure will be apparent from the disclosure of the drawings and detailed description. Additionally, it will be further appreciated that additional or alternative examples of methods of and systems for controlling an electrical accessory may be implemented within the principles set out by the present disclosure.

FIGURES

The above and other objects and advantages of the disclosure will be apparent upon consideration of the following detailed description, taken in conjunction with the accompanying drawings, in which:

FIG. 1 illustrates an electrical power control system for a hybrid vehicle, in accordance with some examples of the disclosure.

FIG. 2 illustrates an example flowchart of an electrical power control method for a hybrid vehicle, in accordance with some examples of the disclosure.

FIG. 3 illustrates an example flowchart of an electrical power control method for a hybrid vehicle, in accordance with some examples of the disclosure

FIG. 5 illustrates an example flowchart of an electrical power control method for a hybrid vehicle, in accordance with some examples of the disclosure.

Figure 4:
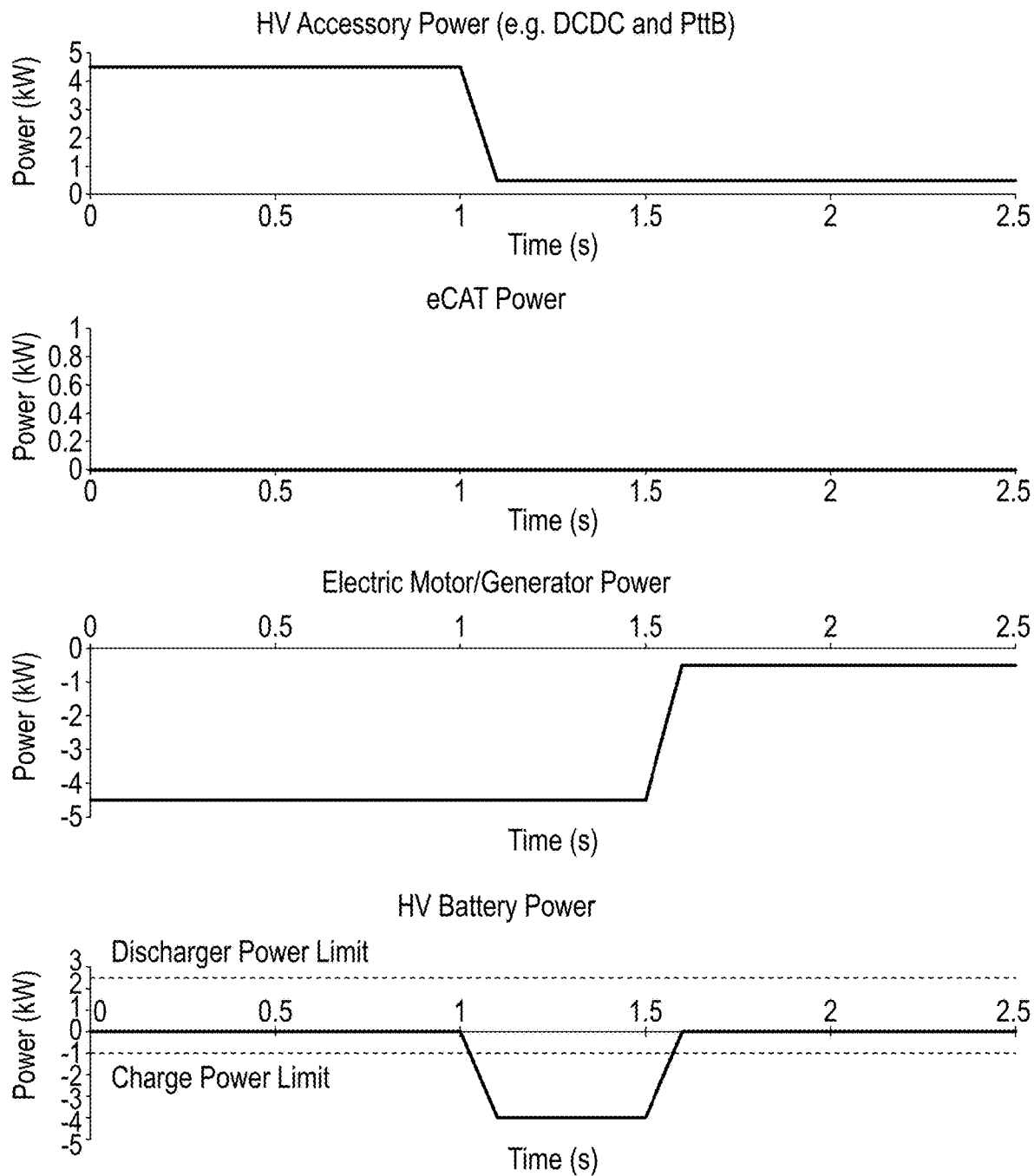
FIG. 4 shows various graphs illustrating the response to transient load removal, in accordance with some examples of the disclosure.

The figures herein depict various examples of the disclosed disclosure for purposes of illustration only. It shall be appreciated that additional or alternative structures, systems and methods may be implemented within the principles set out by the present disclosure.

DETAILED DESCRIPTION

FIG. 1 shows a block diagram representing an electrical power control system 100 (hereinafter referred to as the control system) for a hybrid vehicle. In the example shown in FIG. 1, the control system 100 is for a mild hybrid electric vehicle (mHEV) having an engine 102 coupled to a motor-generator, e.g., belt-driven integrated starter (BISG) 104. The BISG 104 is electrically coupled to a high voltage (HV), e.g., 48V, 350V, and/or any other appropriate voltage, circuit comprising an HV battery/bus 106, one or more HV circuit components, such as a DC-DC converter 108 and/or an inverter, and an electrically heated catalyst (eCat) 110, which is configured to help reduce hydrocarbon and NOx emissions in the exhaust gas flowing from the engine 102 to the exhaust 112. In the example shown in FIG. 1, the DC-DC converter 108 is electrically coupled to a low voltage (LV), e.g., 12V, bus/battery 114, which is configured to supply electrical power to one or more LV accessories of the vehicle.

In the example shown in FIG. 1, the control system 100 comprises a controller 116, e.g., a powertrain control module (PCM), in operational communication with each of the engine 102, the BISG 104, the HV battery/bus 106, the DC-DC converter 108, and the eCat 110. However, the present disclosure is not limited to the set-up shown in FIG. 1. For example, the controller 116 may be any appropriate type of controller, such as a stand-alone controller, or any other appropriate controller of the hybrid vehicle. For example, the controller may, at least in part, be integrated with another controller of the vehicle, such as a controller of the DC-DC convertor 108. Furthermore, the controller 116 may be configured to operationally communicate with any one or more of the vehicle components shown in FIG. 1, and/or any other appropriate components of the vehicle. For example, controller 116 may be a stand-alone controller configured to operationally communicate with at least one HV accessory, an electric motor-generator and an eCat, to control the electrical power output of an HV battery.

While the example shown in FIG. 1 exemplifies the use of the control system 100 for an mHEV, it is understood that the control system 100 may be implemented on an appropriate type of hybrid vehicle, such as a plug-in hybrid electric vehicle (PHEV), having one or more HV circuit components and an eCat.

System 100 shown in FIG. 1 is configured to control the electrical power output of an HV battery of a hybrid vehicle, such that the HV battery remains, as much as possible, within its operational power limits, e.g., charge and discharge limits. In some scenarios, the introduction of (transient) electrical load on the HV circuit can cause the electrical power of the HV battery to operate at a level outside of its operational power limits. Conventional systems and methods react to transient electrical loads by adjusting the power output of a motor generator of the hybrid vehicle to either increase or decrease the power of the HV battery in an attempt to return the power of the HV battery to within its operational power limits. However, while the motor generator is capable of reacting to an electrical power transient, its high inertia, high inductance and communication latencies can cause a delayed reaction in returning the power of the HV battery to within its operational power limits.

The present disclosure provides electrical power control systems and methods that control a power supplied to an eCat to offset transient load changes from other components, such as HV accessories. For example, if the eCat is consuming a certain amount of power, e.g., 1 kW, and another accessory increases its load, e.g., by 1 kW, it would be possible to reduce the eCat load, e.g., to 0W, in order to offset the short-term increase due to the transient load (a "turn-on transient") of the other accessory. In some examples, the power supplied to the eCat may be adjusted at a rate which respects the power capabilities of HV battery/bus 106, and/or as BISG 104 reacts to control the transient load of the other accessory.

In a similar manner, if the eCat is consuming a certain amount of power, e.g., 1 kW, and another accessory decreases its load, e.g., by 1 kW, it would be possible to increase the eCat load in order to offset the short-term decrease due to the transient load (a "turn-off transient") of the other accessory. In other words, the "turn-off transient" (which is often harder to manage within a DCDC or inverter load) could be absorbed briefly within the eCat. So, at turn-off of the un-controlled load of the other accessory, the eCat is briefly turned on to ensure a continuous power drain on the HV battery/bus 106. Subsequently, the eCat 110 can be ramped down in a controlled manner, respecting the dynamic capability of the bus.

FIG. 2 is a flowchart representing an illustrative process 200 for controlling an electrical power of a hybrid vehicle, in accordance with some examples of the disclosure. Whilst the example shown in FIG. 2 refers to the use of system 100, as shown in FIG. 1, it will be appreciated that the illustrative process shown in FIG. 2, and any of the other following illustrative processes, may be implemented on system 100 or on any other appropriately configured system architecture.

At step 202, a change in an electrical load of an ancillary component of the hybrid vehicle is determined, e.g., using control circuitry of controller 116. For example, the controller may be configured to determine a change in an electrical load of one or more HV accessories of the hybrid vehicle. In some examples, the change in the electrical load of one or more HV accessories may a transient load, such as a turn-on transient or a turn-off transient of one or more HV accessories. In the context of the present disclosure the term HV accessory is understood to mean any accessory configured to draw and/or supply power to an HV bus/battery 106 of the hybrid vehicle, such as DC-DC converter 108, an invertor, and/or any other HV circuit component. In some examples, the HV bus/battery and the one or more HV circuit components may be configured to operate using 48V, although any other appropriate voltage may be used, e.g., depending on the configuration of the hybrid vehicle.

At step 204, in response to determining the change in the electrical load of the ancillary component, an electrical load of an eCat of the vehicle e.g., using control circuitry of controller 116. For example, the electrical load of the eCat may be temporarily increased or decreased to offset a transient load of one or more HV accessories, to ensure that the overall electrical load on the HV bus/battery 106 remains, so far as possible, with the operational limits of the HV bus/battery 106. For example, shorter periods of operation outside of the HV battery tolerated power window may result minimizing the risk of HV battery power cut off. For example, one or more components of an HV circuit, such as an HV battery, an HV bus and/or other HV components, may have a voltage limit, e.g., maximum voltage, above which they cease to function and/or set a fault. Additionally or alternatively, one or more components of an HV circuit may have a voltage fluctuation limit, e.g., a voltage change (or rate of change) limit, above which they cease to function and/or set a fault. As such, the electrical load of the eCat may be increased or decreased to ensure that the overall electrical load on an HV circuit remains within a voltage limit and/or within a voltage fluctuation limit.

In some examples, reduced HV battery cycling may reduce the battery ageing, which can enable a smaller battery with less capacity to meet vehicle lifetime requirements. Consequently, this could reduce the overall cost and improve package. The minimization of the duration of any HV battery power excursions outside the power limit window may keep the HV powernet voltage within range. Keeping the HV powernet voltage within range may guarantees the correct performance of the electrical consumers of the powernet, e.g. a DC-DC convertor 108. Additionally or alternatively, there may be no need to shed HV accessory power to protect HV battery from transients, which enables HV accessory power to be maintained at its maximum level of operation. Additionally or alternatively, use of the power management strategies disclosed herein may be used to support bus ripple management, especially in use cases whereby a battery (and its capacitance) is no longer connected to the system, e.g., due to battery protection strategies. Additionally or alternatively, in the event that voltage ripple becomes too great, the eCat 110 can be used in a similar manner to consume power from the HV bus in an attempt to manage the voltage ripple.

The actions or descriptions of FIG. 2 may be used with any other example of this disclosure, e.g., the example described below in relation to FIGS. 3 to 6. In addition, the actions and descriptions described in relation to FIG. 2 may be done in any suitable alternative orders or in parallel to further the purposes of this disclosure.

FIG. 3 shows a flowchart representing an illustrative process 300 for controlling an electrical power of a hybrid vehicle, in accordance with some examples of the disclosure. FIG. 4 shows various graphs illustrating the response to transient load removal. In particular, FIG. 4 shows the response of a conventional system to transient load removal (see graphs 402a, 404a, 406a and 408a), and the response of a system to transient load removal, in accordance with some examples of the disclosure (see graphs 402b, 404b, 406b and 408b). While the example shown in FIGS. 3 and 4 refers to the use of system 100, as shown in FIG. 1, it will be appreciated that the illustrative process and response shown in FIGS. 3 and 4 respectively may be implemented on system 100, or on any other appropriately configured system architecture. For the avoidance of doubt, in the below examples with reference to the graphs shown in FIG. 4, a positive battery power value is understood to mean a power supplied from the battery, e.g., for traction purposes, and a negative battery power value is understood to mean a power supplied to the battery, e.g., for regenerative purposes. In a similar manner, a negative power output from a motor generator is understood to mean an electrical power supplied from the motor generator, e.g., for regenerative purposes.

Graphs 402a, 404a, 406a and 408a illustrate the response of an electrical power control system for a hybrid vehicle using conventional methodology. For example, graph 402b illustrates a drop in the power supplied to the HV accessory of approximately 4.5 kW to 0.5 kW starting at time t=1 second, which defines the turn-off transient in this case.

Graph 408a shows the power of the HV battery in response to the decrease in the electrical load of the HV accessory. For example, the power of the HV battery drops from 0 kW to −4 kW starting at time t=1 second. In this case, the power of the HV battery drops to a value outside of a charge power limit threshold of the HV battery following a drop in the power supplied to the HV accessory.

Graph 406a shows an electric motor-generator reacting to the HV accessory power turn-off transient by decreasing the electrical power output to the HV battery to compensate for the drop in the HV accessory power shown in 402a. However, the motor-generator typically has a high inertia, a high inductance and a communication latency that cause the response to the HV accessory power turn-off transient to be delayed. For example, graph 406*a* shows an increase in the power output of the motor-generator from approximately −4.5 kW to −0.5 kW starting at time t=1.5 seconds.

In response to the motor-generator decreasing its electrical power output, the overall HV battery power increases (e.g., the power input decreases). For example, referring again to graph 408*a*, the power of the HV battery increases from −4 kW to 0 kW starting at time t=1.5 seconds. In this case, the power of the HV battery increases to a value within a charge power limit of the HV battery following the reaction of the electric motor-generator. However, the HV battery is shown to have exceeded its charge power limit for a period of approximately 1.5 seconds. Such cycling of the HV battery, caused by power transients, can lead to premature degradation of the HV battery, which can lead to battery power cut off and subsequent interruption of the HV system operation. Importantly, graph 404*b* shows no response from the eCat due to a drop in the HV accessory power, and the eCat remains deactivated during the transient load event.

Graphs 402*b*, 404*b*, 406*b* and 408*b* illustrate the response of system 100 that implements process 300.

At step 302, controller 116 is configured to determine a decrease in an electrical load of an HV accessory, e.g., a DC-DC convertor 108, of a hybrid vehicle. For example, controller 116 may determine that the electrical load of the DC-DC convertor 108 has dropped. Graph 402*a* illustrates a drop in the power supplied to the HV accessory of approximately 4.5 kW to 0.5 kW starting at time t=1 second and ending at time t=1.1 seconds.

At step 304, controller 116 causes an increase of an electrical load of the eCat 110. For example, in response to the determining the drop in the power supplied to the HV accessory, the controller 116 may cause a proportional increase in the load of the eCat 110. In the example shown in graph 404*b*, the power supplied to the eCat is increased from 0 kW to 4 kW starting at time t=1.1 seconds and ending at time t=1.15 seconds, which is when the HV accessory power ceases to drop and stabilizes at approximately 0.5 kW. However, in an alternative example, the reaction of the eCat 110 may occur as soon as the drop in the HV accessory power is detected, and may continue to be adjusted as the HV accessory power continues to vary. In some examples, the power of the eCat is controlled in a linear manner. For example, controller 116 may issue a request for a certain power output of the eCat 110, and, where a linear control function is implemented, the response time for the eCat to achieve the requested power output can be very short. Where conventional control methods are used, such as pulse width modulation (PWM) control, the actual power output of the eCat 110 may be controlled in a manner that does not enable the eCat 110 to deliver a response that causes the HV battery power to be increased as desired.

Referring to graph 408*b*, the HV battery power responds initially in the same manner described above for graph 408*a*, e.g., there is an initial decrease in the HV battery power from 0 kW to −4 kW (e.g., the power input to the HV battery increases). However, the increase of the electrical load of the eCat 110 causes the power of the HV battery to increase quickly to a power within the charge power limit of the HV battery of the vehicle. For example, the power of the HV battery drops from 0 kW to −4 kW (e.g., the power input to the battery increases) between time t=1 second and t=1.1 seconds, but rises quickly back to 0 kW (e.g., the power input to the battery decreases) between time t=1.1 seconds and t=1.15 seconds. In this manner, the duration of the HV battery power excursion outside of the charge power limit is minimized as a result of the quick contribution of the eCat to the HV bus power balance.

At step 306, controller 116 causes the BISG 104 to react to the HV accessory power turn-off transient shown in graph 402*b* by decreasing the electrical power output to the battery to compensate for the drop in the HV accessory power. However, as discussed above, the motor-generator typically has a high inertia, a high inductance and a communication latency that cause the response to the HV accessory power turn-off transient to be delayed. For example, graph 406*b* shows an increase in the power of the BISG 104 from approximately −4.5 kW to −0.5 kW (e.g., the power output to the battery decreases) starting at time t=1.5 seconds and ending at time t=1.6 seconds. However, in this case, and different from the reaction of the conventional system shown in 408*a*, the overall power of the HV battery 106 does not change as a direct result of the increase in the power of the BISG 104.

At step 308, in response to the increase in the power of the BISG 104, controller 116 causes a decrease of an electrical load of the eCat 110. For example, in response to the determining the increase in the power of the BISG 104, the controller 116 may cause a proportional decrease in the load of the eCat 110 at a rate corresponding to a rate at which the output of the BISG 104 is increased. In the example shown in graph 404*b*, the power supplied to the eCat is decreased from 4 kW to 0 kW stating at time t=1.5 seconds and ending at time t=1.6 seconds, which is when the BISG 104 power ceases to increase and stabilizes at approximately −0.5 km. In this manner, the eCat 110 is controlled to compensate for the increased power of the BISG 104, which results in a stable output from the HV battery within its operational limits. Importantly, control of the eCat 110 in this manner allows for the overall HV battery power to be maintained within operational limits while the system 100 is waiting for the BISG 104 to respond. In other words, eCat 110 power is introduced into the HV battery power balance to minimize the duration of HV battery power excursions outside the tolerated power window.

The actions or descriptions of FIGS. 3 and 4 may be used with any other example of this disclosure, e.g., the example described below in relation to FIGS. 5 and 6. In addition, the actions and descriptions described in relation to FIG. 3 may be done in any suitable alternative orders or in parallel to further the purposes of this disclosure.

FIG. 5 shows a flowchart representing an illustrative process 500 for controlling an electrical power of a hybrid vehicle, in accordance with some examples of the disclosure. FIG. 6 shows various graphs illustrating the response to transient load introduction. In particular, FIG. 6 shows the response of a conventional system to transient load introduction (see graphs 602*a*, 604*a*, 606*a* and 608*a*), and the response to transient load introduction, in accordance with some examples of the disclosure (see graphs 602*b*, 604*b*, 606*b* and 608*b*). While the example shown in FIGS. 5 and 6 refers to the use of system 100, as shown in FIG. 1, it will be appreciated that the illustrative process and response shown in FIGS. 5 and 6 respectively may be implemented on system 100, or on any other appropriately configured system architecture. For the avoidance of doubt, in the below examples with reference to the graphs shown in FIG. 4, a positive battery power value is understood to mean a power supplied from the battery, e.g., for traction purposes, and a negative battery power value is understood to mean a power supplied to the battery, e.g., for regenerative purposes. In a similar manner, a negative power output from a motor generator is understood to mean an electrical power supplied from the motor generator, e.g., for regenerative purposes.

Graphs 602a, 604a, 606a and 608a illustrate the response of an electrical power control system for a hybrid vehicle using conventional methodology. For example, graph 602b illustrates an increase in the power supplied to the HV accessory from approximately 0.5 kW to 5 kW starting at time t=1 second, which defines the turn-on transient in this case.

Graph 608a shows the power of the HV battery in response to the increase in the electrical load of the HV accessory. For example, the power of the HV battery increases (e.g., the power output from the battery increases) from 0 kW to 4.5 kW starting at time t=1 second, as a result of the increase in HV accessory load power. In this case, the power of the HV battery increases to a value outside of a discharge power limit of the HV battery following the increase in the power supplied to the HV accessory.

Graph 606a shows the power of an electric motor-generator reacting to the HV accessory power turn-on transient by increasing its charging power to compensate for the increase in the HV accessory power shown in 602a. However, the motor-generator typically has a high inertia, a high inductance and a communication latency that cause the response to the HV accessory power turn-on transient to be delayed. For example, graph 606a shows a decrease in the power (e.g., an increase in the power output to the battery) of the motor-generator from approximately −2.5 kW to −7 kW starting at time t=1.5 seconds.

In response to the motor-generator decreasing its electrical power, the HV battery power decreases. For example, referring again to graph 608a, the power of the HV battery decreases from −4.5 kW to 0 kW starting at time t=1.5 seconds. In this case, the power of the HV battery decreases to a value below a discharge power limit of the HV battery following the reaction of the electric motor-generator. However, the HV battery is shown to have exceeded its charge power limit for a period of approximately 1.5 seconds. Such cycling of the HV battery, caused by power transients, can lead to premature degradation of the HV battery, and/or HV battery power cut off. Importantly, graph 604b shows no response from the eCat due to a drop in the HV accessory power, and the eCat maintains its power output at 2 kW during the transient load event.

Graphs 602b, 604b, 606b and 608b illustrate the response of system 100 that implements process 500.

At step 502, controller 116 is configured to determine an increase in an electrical load of an HV circuit component, e.g., a DC-DC convertor 108, of a hybrid vehicle. For example, controller 116 may determine that the electrical load of the DC-DC convertor 108 has increased. Graph 602a illustrates an increase in the power supplied to the HV accessory from approximately 0.5 kW to 5 kW starting at time t=1 second and ending at time t=1.1 seconds.

At step 504, controller 116 causes a decrease of an electrical load of the eCat 110, e.g., from a current operational electrical load of the eCat. For example, in response to the determining the increase in the power supplied to the HV accessory, the controller 116 may cause a proportional decrease in the load of the eCat 110. In the example shown in graph 604b, the eCat is consuming power, e.g., as a result of one or more operational parameters of the hybrid vehicle, and the power supplied to the eCat is decreased from 2 kW to 0 kW starting at time t=1.1 seconds and ending at time t=1.15 seconds, which is when the HV accessory power ceases to increase and stabilizes at approximately 5 kW. However, in an alternative example, the reaction of the eCat 110 may occur as soon as the increase in the HV accessory power is detected, and may continue to be adjusted as the HV accessory power continues to vary. In some examples, the power output of the eCat is controlled in a linear manner. For example, controller 116 may issue a request for a certain power output of the eCat 110, and, where a linear control function is implemented, the response time for the eCat to achieve the requested power output can be very short. Where conventional control methods are used, such as pulse width modulation (PWM) control, the actual power output of the eCat 110 may be controlled in a manner that does not enable the eCat 110 to deliver a response that causes the HV battery power to be decreased in the desired manner.

Referring to graph 608b, the HV battery power responds initially in the same manner described above for graph 608a, e.g., there is an initial increase in the HV battery power from 0 kW to 4.5 kW. However, the decrease of the electrical load of the eCat 110 causes the power of the HV battery to decrease quickly to a power equal to the discharge power limit of the HV battery of the vehicle. For example, the power of the HV battery increases from 0 kW to 4.5 kW between time t=1 second and t=1.1 seconds, but drop quickly to 2.5 kW between time t=1.1 seconds and t=1.15 seconds. In this manner, the duration of the HV battery power excursion outside of the discharge power limit is minimized as a result of the quick negative contribution of the eCat to the HV bus power balance. In some examples, the amount by which the eCat 110 power is decreased may be based on the amount by which the HV battery power is outside of the discharge power limit. For example, where the HV battery power limit is 1 kW above the discharge power limit, the eCat 110 power may be reduced by a corresponding value. Using the example shown in graph 604b, this would cause the power of the eCat 110 to be reduced from 2 kW to 1 kW. In this manner, the functionality of the eCat 110 is only reduced by the smallest amount possible to bring the HV battery power to within operational limits. As such, the present disclosure provides an improved method for managing the power of and HV battery whilst maintaining at least some eCat 110 functionality. Such a control strategy is equally applicable to process 300 described above.

At step 506, controller 116 causes the BISG 104 to react to the HV accessory power turn-on transient shown in graph 602b by decreasing the electrical power (e.g., increasing the power output to the battery) to compensate for the increase in the HV accessory power. However, as discussed above, the BSIG 104 may typically have a high inertia, a high inductance and a communication latency that cause the response to the HV accessory power turn-on transient to be delayed. For example, graph 606b shows a decrease in the power (e.g., an increase the power output to the battery) of the BISG 104 from approximately −2.5 kW to −7 kW starting at time t=1.5 seconds and ending at time t=1.6 seconds. However, in this case, and different from example shown in 408b, the power of the HV battery 106 further decreases from 2.5 kW to 0 kW starting at time t=1.5 seconds and ending at time t=1.6.

At step 508, in response to the increase in charging power of the BISG 104, controller 116 causes an increase of the electrical load of the eCat 110. For example, in response to the determining the decrease in the power of the BISG 104, the controller 116 may cause a proportional increase in the load of the eCat 110 at a rate corresponding to a rate at which the power of the BISG 104 is decreased. In the example shown in graph 604b, the power supplied to the eCat is increased from 0 kW to 2 kW stating at time t=1.5 seconds and ending at time t=1.6 seconds, which is when the BISG 104 power ceases to decrease and stabilizes at approximately −7 kW. In this manner, the eCat 110 is controlled to compensate for the decreased power of the BISG 104, which results in a stable power from the HV battery within its operational limits. Importantly, control of the eCat 110 in this manner allows for the HV battery power to be maintained within operational limits while the system 100 is waiting for the BISG 104 to respond. In other words, eCat 110 power is removed from and reintroduced into the HV battery power balance to minimize the duration of HV battery power excursions outside the tolerated power window. In this use case (sudden HV accessory power introduction), process 500 may rely on the eCat 110 being controlled by an engine aftertreatment controller configured to deliver the required power to manage aftertreatment temperature. For example, operation of the eCat 110 may be switched from a primary mode, which is configured to deliver a desired aftertreatment temperature, to a secondary mode, for implementing power management strategies. In this manner, selective operation of the eCat 110 may be implemented to protect the HV battery against uncontrolled accessory power introduction. For example, one of the reasons why an eCat is suitable for use in the control strategies disclosed herein, e.g., as opposed to another linearly controllable electrical device, is because, although its main purpose is aftertreatment temperature management, its operation for thermal management can be tolerant to other strategies making use of its activation.

Figure 6:
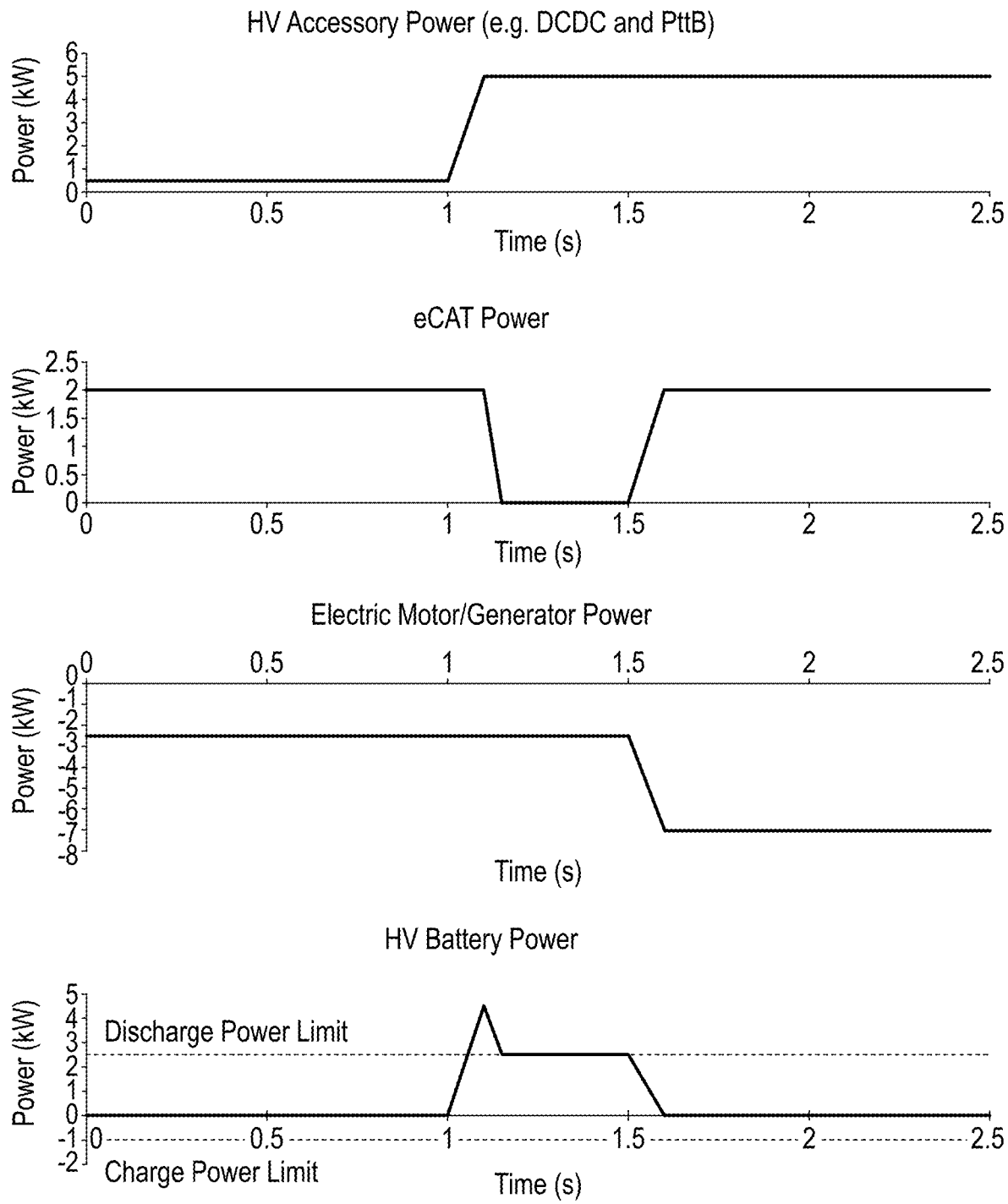
FIG. 6 shows various graphs illustrating the response to transient load introduction, in accordance with some examples of the disclosure.

The actions or descriptions of FIGS. 5 and 6 may be used with any other example of this disclosure. In addition, the actions and descriptions described in relation to FIG. 5 may be done in any suitable alternative orders or in parallel to further the purposes of this disclosure. It will be appreciated that the advantages and benefits described in relation to FIGS. 5 and 6 apply equally to any of the other systems and processes described herein.

Figure 7:
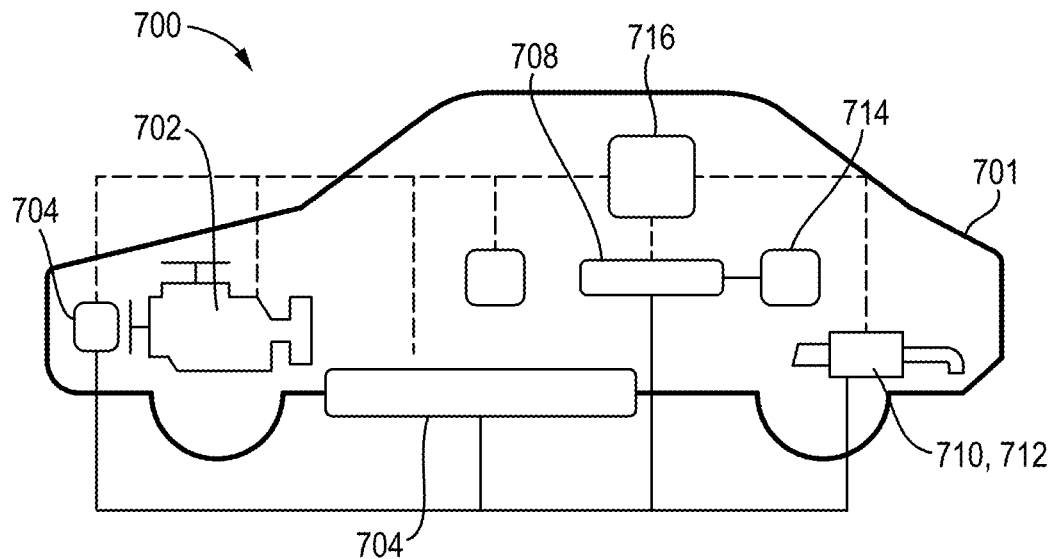
FIG. 7 shows an exemplary hybrid vehicle having an electrical power control system for a hybrid vehicle, in accordance with some examples of the disclosure.

FIG. 7 shows a hybrid vehicle 701 comprising an electrical power control system 700, in accordance with some examples of the disclosure. In the example shown in FIG. 7, the vehicle 701 comprises an engine 702 coupled to a motor-generator, e.g., belt-driven integrated starter (BISG) 704. The BISG 704 is electrically coupled (illustrated by the solid line connectors) to a high voltage (HV), e.g., 48V or 350V, battery/bus 706, one or more HV ancillary components (e.g., HV accessories), such as a DC-DC converter 708 and/or an inverter, and an electrically heated catalyst (eCat) 710, which is configured to help reduce hydrocarbon and NOx emissions in the exhaust gas flowing from the engine 702 to the exhaust 712. In the example shown in FIG. 7, the DC-DC converter 708 is electrically coupled to a low voltage (LV), e.g., 12V, bus/battery 114, which is configured to supply electrical power to one or more LV accessories of the vehicle.

In the example shown in FIG. 7, the control system 700 comprises a controller 716, e.g., a powertrain control module (PCM), in operational communication (illustrated by the dashed line connectors) with each of the engine 702, the BISG 704, the HV battery/bus 706, the DC-DC converter 708, and the eCat 710. However, the present disclosure is not limited to the set-up shown in FIG. 7. For example, the controller 716 may be any appropriate type of controller, such as a stand-alone controller, or any other appropriate controller of the hybrid vehicle. For example, the controller 116 may, at least in part, be integrated with another controller of the vehicle, such as a controller of the DC-DC convertor 708. Furthermore, the controller 716 may be configured to operationally communicate with any one or more of the vehicle components shown in FIG. 1, and/or any other appropriate components of the vehicle. For example, controller 716 may be a stand-alone controller at least partially configured to operationally communicate with at least one HV accessory, an electric motor-generator and an eCat, to control the electrical power output of an HV battery. Furthermore, it is understood that controller 716 may be configured to carry out one or more of the above disclosed electrical power control method for a hybrid vehicle, as described above.

Figure 8:
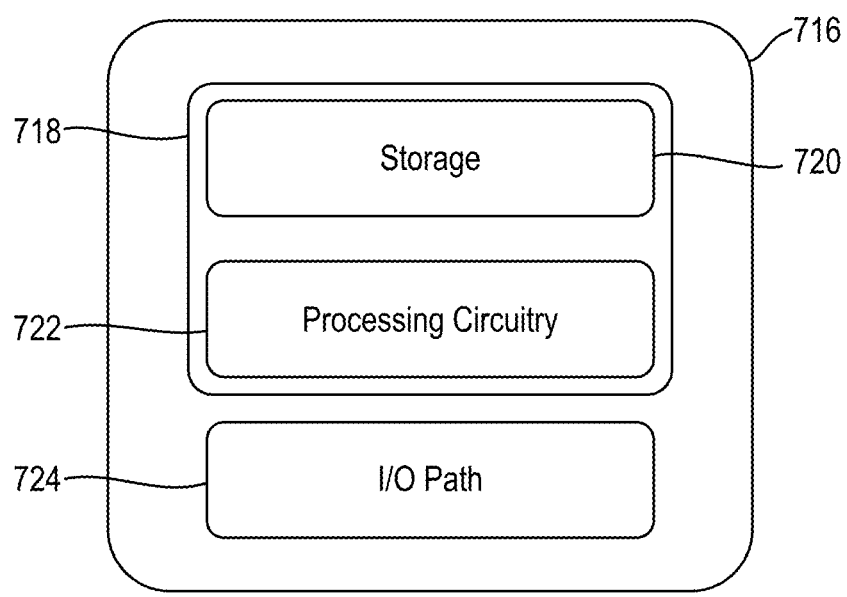
FIG. 8 shows an exemplary block diagram of a control unit, in accordance with some examples of the disclosure.

FIG. 8 shows an exemplary block diagram of a controller 716. Controller 716 includes control circuitry 718, which comprises storage 720 and processing circuitry 722, and I/O path 724. Controller 716 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, e.g., processing circuitry may be distributed across multiple separate processors, multiple of the same type of processors (e.g., two Intel Core i9 processors) or multiple different processors (e.g., an Intel Core i7 processor and an Intel Core i9 processor).

Storage 720, and/or storages of other components of other vehicle controllers, may be electronic storage devices. As referred to herein, the phrase "electronic storage device" or "storage device" should be understood to mean any device for storing electronic data, computer software, or firmware, such as random-access memory, read-only memory, hard drives, and the like, and/or any combination of the same. In some examples, controller 716 executes instructions for an application stored in memory (e.g., storage 720). Specifically, controller 716 may be instructed by an application to perform the methods/functions discussed herein.

Additionally or alternatively, controller 716 may be configured to transmit and/or receive data via I/O path 724. For instance, I/O path 724 may include a communication port(s) configured to transmit and/or receive data from at least one of an engine control module, a powertrain control module and a vehicular system control module, such as an eCat and/or exhaust system control module.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

The invention claimed is:

1. An electrical power control method for a hybrid vehicle, the method comprising:
    determining, using control circuitry, a change in an electrical load of an ancillary component of the vehicle; and
    in response to determining the change in the electrical load of the ancillary component, adjusting, using the control circuitry, an electrical load of an electrically heated catalyst of the vehicle;
    wherein the electrical load of the electrically heated catalyst of the vehicle is adjusted to control a power output of a high voltage battery of the vehicle to a power output less than or equal to a discharge power limit of the high voltage battery; and
    wherein the electrical load of the electrically heated catalyst is adjusted at a rate corresponding to a rate at which the electrical load of the ancillary component changes.

2. The method of claim 1, further comprising:
    determining if the high voltage battery is disconnected from a high voltage bus; and
    in response the determining, adjusting the electrical load of the electrically heated catalyst to balance an overall power of a vehicle powernet.

3. The method of claim 1, wherein the ancillary component comprises a component of a high-voltage circuit of the hybrid vehicle.

4. The method of claim 1, wherein the adjusting step further comprises adjusting the electrical load of the electrically heated catalyst using a linear control algorithm.

5. The method of claim 1, further comprising:
    determining a charge power limit of the high voltage battery; and
    increasing the electrical load of the electrically heated catalyst to prevent the charge power limit of the high voltage battery from being exceeded.

6. The method of claim 1, further comprising:
    monitoring a temperature of the electrically heated catalyst; and
    adjusting the electrical load of the electrically heated catalyst based on the monitored temperature to maintain an optimal operating temperature range.

7. The method of claim 1, wherein the electrical load of an electric motor generator of the vehicle is adjusted in combination with the electrically heated catalyst to control the power output of the high voltage battery of the vehicle to a power output less than or equal to the discharge power limit of the high voltage battery.

8. A system for electrical power control in a hybrid vehicle, comprising control circuitry configured to:
    determine a change in an electrical load of an ancillary component of the vehicle; and
    adjust, in response to determining the change in the electrical load of the ancillary component, an electrical load of an electrically heated catalyst of the vehicle; and
    wherein the electrical load of the electrically heated catalyst of the vehicle is adjusted to control a power output of a high voltage battery of the vehicle to a power output less than or equal to a discharge power limit of the high voltage battery; and
    wherein the control circuitry is further configured to:
    adjust the electrical load of the electrically heated catalyst at a rate corresponding to a rate at which the electrical load of the ancillary component changes.

9. The system of claim 8, wherein the control circuitry is further configured to:
    determine if the high voltage battery is disconnected from a high voltage bus; and
    adjust, in response to the determining, the electrical load of the electrically heated catalyst to balance an overall power of a vehicle powernet.

10. The system of claim 8, wherein the ancillary component comprises a component of a high-voltage circuit of the hybrid vehicle.

11. The system of claim 8, wherein the control circuitry is further configured to:
    adjust the electrical load of the electrically heated catalyst using a linear control algorithm.

12. The system of claim 8, wherein the control circuitry is further configured to:
    determine a charge power limit of the high voltage battery; and
    increase the electrical load of the electrically heated catalyst to prevent the charge power limit of the high voltage battery from being exceeded.

13. The system of claim 8, wherein the control circuitry is further configured to:
    monitor a temperature of the electrically heated catalyst; and
    adjust the electrical load of the electrically heated catalyst based on the monitored temperature to maintain an optimal operating temperature range.

14. The system of claim 8, wherein the control circuitry is further configured to:
    adjust the electrical load of an electric motor generator of the vehicle in combination with the electrically heated catalyst to control the power output of the high voltage battery of the vehicle to a power output less than or equal to the discharge power limit of the high voltage battery.

15. An electrical power control method for a hybrid vehicle, the method comprising:
    determining, using control circuitry, a change in an electrical load of an ancillary component of the vehicle; and
    in response to determining the change in the electrical load of the ancillary component, adjusting, using the control circuitry, an electrical load of an electrically heated catalyst of the vehicle;
    wherein the electrical load of the electrically heated catalyst of the vehicle is adjusted to control a power output of a high voltage battery of the vehicle to a power output less than or equal to a charge power limit of the high voltage battery; and
    wherein the electrical load of the electrically heated catalyst is adjusted at a rate corresponding to a rate at which the electrical load of the ancillary component changes.

16. The method of claim 15, wherein the electrical load of an electric motor generator of the vehicle is adjusted in combination with the electrically heated catalyst to control the power output of the high voltage battery of the vehicle to a power output less than or equal to the charge power limit of the high voltage battery.

\* \* \* \* \*